United States Patent [19]

Lakoski et al.

[11] Patent Number: 4,898,009
[45] Date of Patent: Feb. 6, 1990

[54] PROTECTIVE COVER FOR A PERSONAL COMPUTER

[75] Inventors: Robert P. Lakoski, Austin, Tex.; Jody L. Numbers, Tempe, Ariz.

[73] Assignee: Lama Systems Inc., Austin, Tex.

[21] Appl. No.: 327,120

[22] Filed: Mar. 22, 1989

[51] Int. Cl.⁴ ............................................. E05B 70/00
[52] U.S. Cl. ........................................ 70/58; 70/161; 70/168
[58] Field of Search ...................... 70/57, 58, 158, 159, 70/160, 161, 162, 163, 164, 165, 166, 167, 168, 169, 170, 171, 172, 173

[56] References Cited

U.S. PATENT DOCUMENTS 2,181,828  11/1938  Ingwer .
3,096,407   7/1963  Hubbell .
4,248,069   2/1981  Burbank .
4,656,848   4/1987  Rose ....................................... 71/58
4,741,185   5/1980  Weinert ................................. 70/57

FOREIGN PATENT DOCUMENTS 8205741  12/1981  Netherlands .
2160253  12/1985  United Kingdom .................... 70/58

Primary Examiner—Robert L. Wolfe
Attorney, Agent, or Firm—Leydig, Voit & Mayer

[57] ABSTRACT

Apparatus and methods involving an attachable and lockable, vented security cover enclosure for the back of a personal computer dimensioned to conform to the computer configuration, cover cabling and cable connectors, and deter unauthorized access to the system components, power switch, and the back of a computer.

10 Claims, 2 Drawing Sheets

PROTECTIVE COVER FOR A PERSONAL COMPUTER

TECHNICAL FIELD

This invention relates to computer security equipment and, more particularly, to exteriorly securing the back of a computer by covering with a vented enclosure, the rear panel thereof including the ports, cable connectors, power cords, access screws, and the on/off power switch conventionally located rearwardly on the right side of the computer.

BACKGROUND OF THE INVENTION

Computer security has become an issue of great significance with burgeoning use of personal computers in every phase of business and personal life. There is no need for review of the significant numbers of reported incidences related to the introduction of viruses to computer networks, industrial and political espionage, theft, vandalism, etc. Personal computers today are becoming required tools, particularly in business, much like the telephone. The expenses associated with personal computing have prompted the introduction of a host of new protective software programs, a range of security hardware devices and even the passage of new legislation.

In the context of protective devices, Robert P. Lakoski is a name synonymous with the art, having contributed to a number of security devices. They include, for example, U.S. Pat. No. 4,685,312 issuing Aug. 11, 1987 which depicts a portable locking device for securing the front (data drive) of a personal computer. Likewise, Application Ser. Nos.: 227,129 filed Aug. 2, 1988 entitled COMPUTER DATA DRIVE LOCKING DEVICE; 267,265 filed Nov.4, 1988 entitled PERSONAL COMPUTER ACCESS CONTROL SYSTEM; and 268,283 filed Nov.7, 1988 entitled COMPUTER DRIVE BEZEL ATTACHMENT, are all directed to personal computer security and limiting access thereto by unauthorized users. All of these devices share the common purpose of deterring data drive access.

Given that most data manipulation and input access occurs on the front side of the computer, protective devices such as those referred to above are directed to securing the data drives. Little attention, however, has been given to the vulnerable back end of a computer which generally contains the ports, cable connectors, power cabling, etc. Conventional construction of personal computer housings include screws disposed along the periphery of the back edge of the computer housing which secure it to the base support. The function of the base support is to provide the structural floor for the electronics and circuitry comprising a personal computer. The support often contains specialized and very expensive boards or cards dedicated to particular application requirements for the personal computer. Some of these processing/graphics/communications cards can cost thousands of dollars. Installation or removal of the cards is accomplished by unscrewing the housing screws, displacing the housing, and then inserting or pulling the card from the appropriate slot within the computer. If the card is the object of a theft, the theft can remain undetected, at least for a short period of time, if the thief replaces the computer housing into its original position. Hence, the absence of the card will be camouflaged.

Furthermore, in the event that a personal computer is properly secured at the data drive ports with, for example, one of the devices identified above, a knowledgeable individual can switch the A drive cabling to the B drive within the computer to defeat a diskette drive lock and software contained therein. Another aspect of potential data theft from a computer containing hardware software access deterring devices is to intercept the computer at the modem port. Access to the modem and modem port may obviate the need to enter the computer from the data drive interface. Valuable incoming information or access to internal information may be achieved by sophisticated intercept devices associated with modem cabling or a modem port.

Power switch (on/off) access control, standing alone, is often an impractical concept in the use of a computer. First, on long data runs, the power cannot be turned off without potentially disastrous loss of information. Secondly, to accommodate background programs such as Fax, file server activity, message machine, etc., the computer must be left on at all times. Hence, the switch should remain in the "on" position and power switch actuation security is meaningless.

The foregoing description of technical problems associated with access to the back portion of a computer is further augmented by the unsightly and disorganized cabling mess that normally is associated with the back of the computer. This cabling mess is further augmented by house cleaning problems such as accumulation of dust and dirt around cabling, ports, and the desks or tables upon which the computer rests.

SUMMARY OF THE INVENTION

It is an object of this invention to overcome the problems identified with respect to access of personal computers from and through the the back panel.

It is another object of this invention to provide a personal computer security cover capable of securing the cabling, ports, and the access panel to the back of a computer.

Still another object of this invention is to provide a means to organize cabling and power cords.

It is a further object of this invention to provide an attractive, functional, and dirt and dust resistant cover for the computer back panel.

Still another object of this invention is to provide on/off power switch access control cover associated with a security cover.

Yet another object of this invention is to provide protection from unauthorized access through communication ports and the like in combination with data drive securing devices.

A further object of the invention is to provide enhanced protection of a computer back panel while defining a uniform structure.

These and other objects are satisfied by an access control device for the back side of a personal computer with a base and back panel including cable ports secured to the base with a plurality of peripheral attachment screws, comprising:

(a) enclosure means for enclosing at least a portion of the back panel, said enclosing means having a height selected to conform to the back panel, a depth sufficient to cover cable port connectors and a width selected to correspond to selected attachment screws, cabling ports, a first element of a first cooperating mounting member, a first element of a second cooperating mounting member, and a plurality of venting slots, (b) a second element of said first cooperating mounting member, said second element having securing means for attaching said second element to the computer, said first and second elements of said first cooperating mounting member being engagable to secure said enclosure means to the computer with at least one peripheral screw, (c) a second element of said second cooperating mounting member having attachment means for securing to the computer, said first and second elements of said second cooperating mounting member being engagable to secure said enclosure means to the computer with at least one peripheral screw, and (d) locking means to lock said enclosure to the computer when said enclosure is secured to cover the back panel.

Still other objects are satisfied by a personal computer securing extension for a personal computer housing having a back panel with cabling ports and power cord ports where the back panel is secured to the computer with a plurality of peripherally disposed screws, comprising:

a box-like cover means for covering the back panel dimensioned to have a height and width corresponding to the height and width of the computer housing and a depth sufficient to cover the ports and cable and power cord connectors connected to the ports, said cover means including feedthrough openings for cabling and cords, a first element of a cooperating attachment member, and vent means for promoting air circulation within said cover means;

a second element of a cooperating attachment member, said second element being attached to the computer housing by a select number of the peripheral screws, where engaging said first and second elements establishes said attachment member which demountably mounts said cover means to the computer housing, and locking means for locking said cover means to the computer housing when said attachment member is established.

Yet other objects of this invention are satisfied by a process for securing the back of a personal computer with a back panel secured thereto with peripheral attaching elements, comprising the steps of:

(a) selecting a cover having a height conforming to the back panel and a depth sufficient to cover cable port connectors, (b) selecting a cooperating attachment member configured to correspond to at least one of the peripheral attaching elements and to the cover, (c) attaching the cooperating attachment member to the computer with at least one of the peripheral attachment elements, (d) securing the cover to the cooperating attachment member, (e) locking the cover to the computer with an interacting lock device located on the cover, and (f) venting the interior of the cover when attached to the computer.

Given the following enabling description of the drawings, the fabrication and use of the invention should be evident to the person of ordinary skill in the art.

DETAILED DESCRIPTION OF THE ILLUSTRATED EMBODIMENTS

Figure 1:
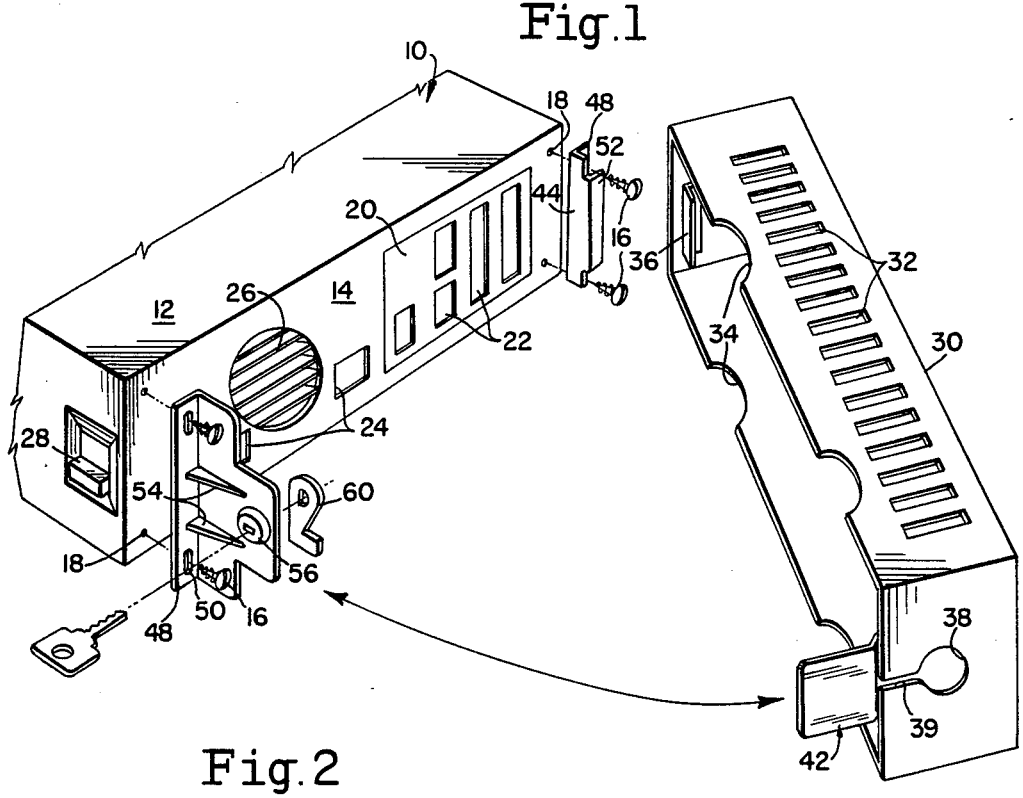
FIG. 1 is a perspective exploded view of an embodiment of the invention.
Figure 2:
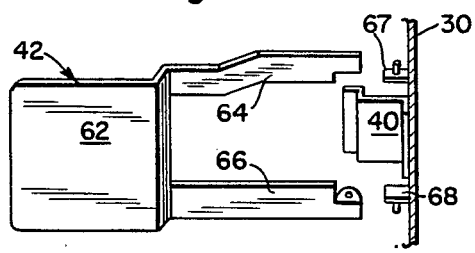
FIG. 2 is a segmented view of a pivotal switch cover in accordance with this invention.

In FIG. 1, the back of conventional personal computer 10 is illustrated. Computer 10 includes housing 12 and back panel 14. Back panel 14 is attached to housing 12 with a number of screws 16 disposed around its peripheral edge. Back panel 14 includes communication port opening 20 containing ports 22 (RS232 and the like) adapted to connect various internal cards and boards (not illustrated) via conventional connectors (not illustrated). Panel 14 also includes power cord and keyboard ports 24 as well as internal fan vent 26. Toggle power switch 28 is recessed in the right side of computer housing 12. This general inventory of components is what the instant invention is intended to protect.

Figure 3:
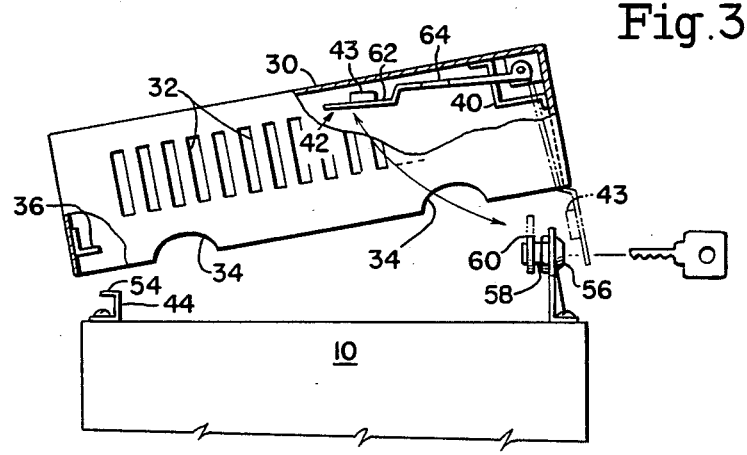
FIG. 3 is a top view of the embodiment of FIG. 1.

The principal feature of the embodiment of the invention depicted in FIGS. 1 and 3 include 0.060 inch (60 mil) steel cover 30. For an IBM ® AT computer, for example, cover 30 has a length, width and depth of 21 inches, 5½ inches and 4 inches, respectively. It is evident that any material of appropriate strength (i.e. polycarbonates, etc.) and characteristics can be employed for manufacture of case 30. However, resin coated steel provides an aesthetic finish and durable material perfectly suited for cover 30. Cover 30 includes vents 32, cable passages 34, internal catch 36, opening 38 with lead-in slit 39, internal keeper catch 40 and pivotal power switch blocking panel 42 incorporating horizontally projecting lug 43.

Cover 30 is attached to computer 10 by trusses 44 and 46. Both trusses 44 and 46 include a base portion 48 adapted to lie flush on back panel 14 where the base 48 includes screw holes 50 alignable with holes 18 and to receive screws 16 so trusses 44 and 46 can be attached to computer 10. Trusses 44 and 46 differ in details. Truss 44, for example, includes lip 52 which is dimensioned to engage and secure catch 36 on cover 30. Truss 46, on the other hand, is reinforced with struts 54 and incorporates key-actuated lock plug 56. Lock plug 56 features shaft 58 of irregular geometry onto which rotatable finger catch 60 is affixed. Finger latch 60 when rotated to engage keeper catch 40, secures cover 30 to computer 10. Since trusses 44 and 46 as screwed onto computer 10 and are completely covered by cover 30 when locked, cover 30 cannot be removed from computer 10 without damaging it or at least without clear evidence of tampering.

Briefly referring to switch cover 42 its purpose is to cover switch 28 if desired. One convenient embodiment of switch cover 42 includes plate 62 dimensioned to completely block access to switch 28 when extended (see dashed lines in FIG. 3). Switch cover 42 may include horizontally lug 43 projecting a sufficient distance from plate 62 to prevent switch 28 from being moved if an unauthorized user is successful in leavening plate 62 a slight distance from the side of computer 10. To secure plate 42 and accommodate keeper catch 40, upper and lower arms 64 and 66, generally corresponding in length to the depth of cover 30, are pivotally mounted on spaced pivot pin elements 67 and 68 located in the back corner of cover 30. This arrangement permits switch cover 42 to be pivoted between a neutral position (FIG. 3) or the actuated position (FIG. 1).

Referring briefly to opening 38 and slot 39, they are provided to accommodate pivoting cover 30 about interlocked catch 36-truss 44 and over lock 56 in truss 46. If the key remains in lock 56 then slot 39 allows cover 30 to slide over the key (if properly arranged slot 39 will accommodate only the thickness of the lug thus permitting translation of cover 30, only when it is in the unlocked position).

Certain features previously identified but not discussed are vents 32. Since, as a basic matter of physics computing with conventional components, generates considerable heat and, hence, the purpose of fan vent 26, cover 30 includes vents 32 to promote air circulation. Cable passages also 34 contribute to air circulation but their primary purpose is evident; to provide access to ports 22, etc. In organizing the cabling exiting through passages 34, not only are the aesthetics of a computer work station improved but also effective cable strain relief is achieved since cover 30 prevents jamming or compressing of computer junctions and connectors against a wall or another machine.

Summarizing the use of cover 30, it is installed by engaging internal catch 36 with truss 44 sliding the slot 39 over the key and engaging finger latch 60 with keeper catch 40. Computer power switch 28 may be secured or uncovered depending on the position of switch cover 42.

Figure 4:
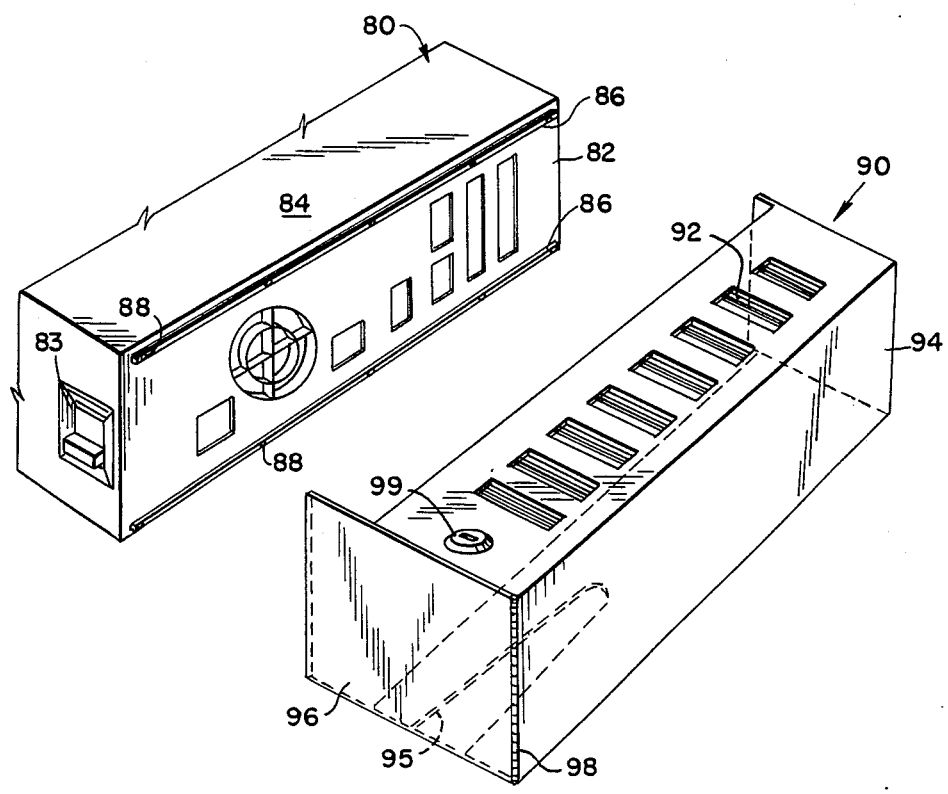
FIG. 4 is a perspective exploded view of a second embodiment of the invention.
Figure 5:
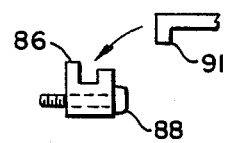
FIG. 5 is a cutaway side view of the track type connector in accordance with this invention.

Referring briefly to a second embodiment of the invention illustrated in FIG. 4, personal computer 80 corresponds to computer 10 in FIG. 1. Computer 80 has ports, fan vents and a power switch. Computer 80 includes back panel 82 which is screwed onto housing 84 with a plurality of peripheral screws. Grooved tracks 86 are secured to the back panel with screws 88 (see FIG. 5). Grooved tracks may be in the form of a unitary U-shaped extrusion, upper and lower strips (illustrated) or even individual segments.

Now reviewing case 90, it is a box-like structure featuring an open front. Case 90 includes vents 92 formed in the top wall, fixed side wall 94 which has a forward projection sufficient to abut the side of housing 84, pivotal side wall 96 which is connected to case 90 by internally projecting hinge 98. Side 96 is of a length sufficient to cover switch 83 on computer 80. Side 96 also includes a keeper catch (not illustrated) which interlocks with key-actuated lock 99 when in the closed position, as illustrated. Formed in the bottom of case 90 is elongated longitudinally extending cabling slot 95. Finally, the front edges of the top and bottom of case 90 include projecting tongues 91 which are dimensioned to correspond to the dimensions of the groove in track 86 in order to translate along track 86 and be secured in the groove.

To position cover 90 on computer 80, side 96 is unlocked and pivoted to the open position. The portion of tongues 91 adjacent side 96 are translated onto tracks 86 on the left side of the computer (opposite switch 83). The cabling exiting from connectors on back 82 are moved into slot 95 and case 90 translated along track 86 to where the front projection of side wall 94 abuts computer housing 84. Side 96 is pivoted to the closed, switch blocking position and lock 99 engaged to lock side 96 in that position. Thus, the back of computer 80 is secured.

When combined with disk drive security system, this invention enhances overall security confidence of the authorized user of a personal computer. As should be evident, the invention also provides protection, both mechanical and tamper security, for the cables, cable connection, or ports and even internal cards.

Given the foregoing, many variations, combinations and modifications of the instant invention should now be readily apparent to the person of ordinary skill in the art and, consequently, are intended to fall within the spirit and scope of the invention defined by the following claims.

We claim:

1. An access control device for the back of a personal computer having a base and back panel secured to the base with a plurality of peripheral attachment screws, comprising:
   (a) enclosure means for enclosing at least a portion of the back panel, said enclosing means having a height selected to conform to the back panel, a depth sufficient to cover cable port connectors and a width dimensioned to correspond to selected attachment screws, cabling ports, a first element of a first cooperating mounting member, a first element of a second cooperating mounting member, and a plurality of venting slots,
   (b) a second element of said first cooperating mounting member, said second element having securing means for attaching said second element to the computer with at least one peripheral screw, said first and second elements of said first cooperating mounting member being engagable to secure said enclosure means to the computer,
   (c) a second element of said second cooperating mounting member having attachment means for securing to the computer with at least one peripheral screw, said first and second elements of said second cooperating mounting member being engagable to secure said enclosure means to the computer,
   (d) locking means to lock said enclosure to the computer when said enclosure is secured to cover the back panel.

2. An access control device according to claim 1 where the length of said enclosure means corresponds to the width of the computer and where said first elements of said first and second mounting members are remotely spaced and located proximate to the interior edges of said enclosure means.

3. An access control device according to claim 2 where said first element of said first cooperating mounting member defines a catch of a length corresponding to the width of said enclosure means with screw holes at each end to attach to the computer with two of the peripheral screws, and said second element defines a catch which is pivotally engagable with said first element.

4. An access control device according to claim 3 where said second element of said second cooperating mounting member is an interiorly mounted keeper, said first element of said second cooperating mounting member is a bent plate having a length corresponding to the width of said enclosure means with screw holes at each end to attach said element to the computer with two peripheral screws, a key-actuated plug lock and a rotatable locking lug dimensioned to engage said keeper when said lock is rotated into the locking position, said enclosing means further defining an aperture there-through corresponding to the lock position on said first element of said second cooperating mounting member to permit rotation, insertion and withdrawal of the key.

5. An access control device according to claim 4 further comprising power actuation switch cover means for blocking access to the power switch of the computer.

6. An access control device according to claim 5 where said switch actuation cover means is pivotally mounted to the interior of said enclosure means to pivot between a switch blocking position when in the extended position and a switch unblocking position when said cover means is pivoted inside said enclosure means.

7. An access control device according to claim 1 where said cover means includes two arms connected to said enclosure means and where said plug lock projects between the arms.

8. A personal computer securing extension for a personal computer housing having a back panel with cabling ports and power cord ports where the back panel is secured to the computer with a plurality of peripherally disposed screws, comprising:

a box-like cover means for covering the back panel dimensioned to have a height and width corresponding to the height and width of the computer housing and a depth sufficient to cover the ports and cable and power cord connectors connected to the ports, said cover means including feedthrough openings for cabling and cords, a first element of a cooperating attachment member, and vent means for promoting air circulation within said cover means;

a second element of a cooperating attachment member, said second element being attached to the computer housing by a select number of the peripheral screws, where engaging said first and second elements establishes said attachment member which demountably mounts said cover means to the computer housing, and locking means for locking said cover means to the computer housing when said attachment member is established.

9. A securing extension according to claim 8 where said second element is a ground track disposed along three of the edges of the back panel, and said first element is a tongue disposed on the interior upper and lower edges of said cover means, further comprising a catch disposed within said cover means, a pivotally mounted side panel of a length adapted to abut a portion of a side of the computer housing, said panel incorporating a key-actuated plug lock with a rotatable keeper to engage said catch.

10. A process for securing the back of a personal computer with a back panel secured thereto with peripheral attaching elements, comprising the steps of:

(a) selecting a cover having a height conforming to the back panel and a depth sufficient to cover cable port connectors, (b) selecting a cooperating attachment member configured to correspond to at least one of the peripheral attaching elements and to the cover, (c) attaching the cooperating attachment member to the computer with at least one of the peripheral attachment elements, (d) securing the cover to the cooperating attachment member, (e) locking the cover to the computer with an interacting lock device located on the cover, and (f) venting the interior of the cover when attached to the computer.

* * * * *